US009912497B2

United States Patent
Al-Dweik

(10) Patent No.: US 9,912,497 B2
(45) Date of Patent: *Mar. 6, 2018

(54) SIGNAL DETECTION IN A COMMUNICATION SYSTEM

(71) Applicant: Khalifa University of Science and Technology, Abu Dhabi (AE)

(72) Inventor: Arafat Jamil Al-Dweik, Abu Dhabi (AE)

(73) Assignee: Khalifa University of Science and Technology (AE)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,568

(22) Filed: Nov. 29, 2016

(65) Prior Publication Data

US 2017/0078116 A1    Mar. 16, 2017

Related U.S. Application Data

(63) Continuation of application No. 14/809,592, filed on Jul. 27, 2015.

(51) Int. Cl.
*H04L 25/02* (2006.01)
*H04L 1/00* (2006.01)
*H04L 27/26* (2006.01)

(52) U.S. Cl.
CPC ........ *H04L 25/0212* (2013.01); *H04L 1/0054* (2013.01); *H04L 27/2647* (2013.01); *H04L 27/2666* (2013.01)

(58) Field of Classification Search
CPC . H04L 1/0045; H04L 1/0054; H04L 27/2646; H04L 27/2647; H04L 27/2666
See application file for complete search history.

(56) References Cited

U.S. PATENT DOCUMENTS

| 7,313,203 | B2 | 12/2007 | Tubbax |
| 9,596,119 | B2 * | 3/2017 | Al-Dweik ........... H04L 27/2647 |
| 2006/0178755 | A1 | 8/2006 | Ling |

(Continued)

OTHER PUBLICATIONS

ETSI: "Radio Broadcasting Systems; Digital Audio Broadcasting (DAB) to mobile, portable and fixed receivers" ETSI EN 300 401 V1.4.1, European Standard (Telecommunications series), Jan. 2006, pp. 1-197.

(Continued)

*Primary Examiner* — David B. Lugo
(74) *Attorney, Agent, or Firm* — Hayes Soloway PC

(57) ABSTRACT

There is provided a computer-implemented method of estimating transmitted signals in a communication system, the signals being transmitted by a transmitter to a receiver over a communication channel having a channel response, the method comprising estimating the transmitted signals based on generated trial sequences minimizing the channel response between adjacent received signals. There is also provided a receiver, a signal detector device and a communication system adapted to estimated transmitted signals in a communication system by generating trial sequences and determining the generated trial sequences minimizing the channel response between adjacent received signals. The present invention is particularly adapted for OFDM communication systems.

8 Claims, 12 Drawing Sheets

(56) References Cited

U.S. PATENT DOCUMENTS

2013/0343446 A1 12/2013 Eliaz

OTHER PUBLICATIONS

ETSI: "Digital Video Broadcasting (DVB); Framing structure, channel coding and modulation for 11/12 GHz satellite services" EN 300 421 V1.1.2, European Standard (Telecommunications series), 1997-1998, pp. 1-24.

IEEE Standards Association, "IEEE Standard for Local and metroplitan area networks—Part 16: Air Interface for Broadband Wireless Access Systems—Amendment 3: Advanced Air Interface", IEEE Std 802.16m™, 2009, pp. 1-1064 (1106 total pages).

ETSI: "LTE; Evolved Universal Terrestrial Radio Access (E-UTRA); Physical channels and modulation (3GPP TS 36.211 version 10.0.0 Release 10)", ETSI TS 136 211 V10.0.0, Jan. 2011, pp. 1-104 (105 total pages).

Zhao, Zijun, et al., "Channel Estimation Schemes for IEEE 802.11p Standard", IEEE Intelligent Transportation Systems Magazine, Oct. 25, 2013, pp. 38-49.

IEEE Standards Association, "IEEE Standard for Broadband over Power Line Networks: Medium Access Control and Physical Layer Specifications", IEEE Communications Society, IEEE Std 1901™, Dec. 30, 2010, pp. 1-1540 (1586 total pages).

Zhang, Weile, et al., "One-Shot Blind CFO and Channel Estimation for OFDM With Multi-Antenna Receiver", IEEE Transactions on Signal Processing, Aug. 1, 2014, 3799-3808, vol. 62, No. 15.

Noh, Song, et al., "A New Precoder Design for Blind Channel Estimation in MIMO-OFDM Systems", IEEE Transactions on Wireless Communications, Dec. 2014, pp. 7011-7024, vol. 13, No. 12.

Tseng, Chi-Hsiang, et al., "Subspace-Based Blind Channel Estimation for OFDM by Exploiting Cyclic Prefix", IEEE Wireless Communications Letters, Dec. 2013, pp. 691-694.

Banani, Seyed Alireza, et al., "OFDM With Iterative Blind Channel Estimation", IEEE Transactions on Vehicular Technology, Nov. 2010, pp. 4298-4308, vol. 59, No. 9.

Zhang, Hongting, et al., "Robust Pilot Detection Techniques for Channel Estimation and Symbol Detection in OFDM Systems", IEEE Signal Processing Letters, Jun. 2015, pp. 733-737, vol. 22, No. 6.

Qi, Chenhao, et al., "Pilot Design for Sparse Channel Estimation in OFDM-Based Cognitive Radio Systems", IEEE Transactions on Vehicular Technology, Feb. 2014, pp. 982-987, vol. 63, No. 2.

Liu, Guanghui, et al., "Adaptive Complex Interpolator for Channel Esitmation in Pilot-Aided OFDM System", Journal of Communications and Networks, Oct. 2013, pp. 496-503, vol. 15, No. 5.

Chen, Jung-Chieh, et al., "An Efficient Pilot Design Scheme for Sparse Channel Estimation in OFDM Systems", IEEE Communications Letters, Jul. 2013, pp. 1352-1355, vol. 17, No. 7.

Yu, Mingchao, et al., "A Study of Pilot-Assisted OFDM Channel Estimation Methods with Improvements for DVB-T2", IEEE Transactions on Vehicular Technology, Jun. 2012, pp. 2400-2405, vol. 61, No. 5.

Tan, Peng, et al., "Effect of Channel Estimation Error on Bit Error Probablity in OFDM Systems over Rayleigh and Ricean Fading Channels", IEEE Transactions on Communications, Apr. 2008, pp. 675-685, vol. 56, No. 4

Tomasin, Stefano, et al., "Analysis of Interpolated Channel Estimation for Mobile OFDM Systems", IEEE Transactions on Communications, May 2010, pp. 1578-1588, vol. 58, No. 5.

Šimko, Michal, et al., "Adaptive Pilot-Symbol Patterns for MIMO OFDM Systems", IEEE Transactions on Wireless Communications, Sep. 2013, pp. 4705-4715, vol. 12, No. 9

D'Agostini, Fábio, et al., "Adaptive Concurrent Equalization Applied to Multicarrier OFDM Systems", IEEE Transactions on Broadcasting, Sep. 2008, pp. 441-447, vol. 54, No. 3.

Henkel, Martin, et al., "Comparison of Channel Estimation methods for pilot aided OFDM systems", IEEE, 2007, pp. 1435-1439.

Al-Dweik, A., et al., "Carrier Frequency Offset Estimation for OFDM Systems Over Mobile Radio Channels", IEEE Transactions on Vehicular Technology, Feb. 2010, pp. 974-979, vol. 59, No. 2.

Zeng, Xiang Nian, et al., "A Blind Carrier Frequency Offset Estimation Scheme for OFDM Systems with Constant Modulus Signaling", IEEE Transactions on Communications, Jul. 2008, pp. 1032-1037, vol. 56, No. 7.

ETSI: "Universal Mobile Telecommunications System (UMTS); Deployment aspects (3GPP TR 25.943 version 9.0.0 Release 9)", ETSI TR 125 943 V9.0.0, Technical Report, Feb. 2010.

Jakes, William C., et al., "Microwave Mobile Communications", IEEE, Jan. 1994, pp. 1-642 (645 total pages).

\* cited by examiner

SIGNAL DETECTION IN A COMMUNICATION SYSTEM

FIELD OF THE DISCLOSURE

The invention relates to communication systems and more particularly to a computer-implemented method, system, signal detector device and receiver for estimating transmitted signals in a communication system, particularly an OFDM communication system.

BACKGROUND OF THE DISCLOSURE

In the last few years, modern communication systems have witnessed a significant shift towards the use of mobile communication systems. Latest statistics show that the total number of mobile phones subscribers is about 5 billion by the end of 2014.

One of the main limitations that mobile users are currently facing is the power limitation of their devices, which usually rely on small size batteries. The power problem in wireless networks is mainly due to the severe nature of the wireless communications channels, which usually requires pumping additional transmission power.

In addition to the transmission power, the processing power is also becoming a dominant factor that determines the power efficiency of mobile devices. The processing power is required to extract the information at the receiver side which includes channel estimation, synchronization, error correction and data detection.

Generally speaking, the processing power consumed per information bit is not significant. Therefore, the total processing power for low data rate communications is tolerable in general. However, a significant portion of the traffic over mobile networks is currently carrying video information, which implies that the number of bits to be processed per unit time is huge. Consequently, the processing power becomes a dominant factor that determines the overall power consumption in the mobile handset.

Orthogonal Frequency Division Multiplexing (OFDM) is well known as a highly spectral efficient transmission scheme capable of dealing with severe channel impairment encountered in a wireless environment. The basic idea of OFDM is to divide the available spectrum into several sub-channels (sub-carriers). By making all sub-channels narrowband, they experience almost flat fading, which makes equalization very simple. To obtain a high spectral efficiency the frequency response of the sub-channels are overlapping and orthogonal. This orthogonality can be completely maintained, even though the signal passes through a time-dispersive channel, by introducing a cyclic prefix (or guard interval). A cyclic prefix is a copy of the last part of the OFDM symbol which is pre-appended to the transmitted symbol. This makes the transmitted signal periodic, which plays a decisive role in avoiding inter-symbol and inter-carrier interference.

OFDM signaling can largely eliminate the effects of inter-symbol interference for high-speed transmission in highly dispersive channels by separating a single high speed bit stream into a multiplicity of much lower speed bit streams each modulating a different sub-carrier.

Fortunately, the apparently very complex processes of modulating (and demodulating) thousands of sub-carriers simultaneously are equivalent to Discrete Fourier Transform operations, for which efficient Fast Fourier Transform (FFT) algorithms exist. Thus, integrated circuit implementations of OFDM demodulators are feasible for affordable mass-produced receivers. Furthermore, the use of error coding, interleaving, and channel-state information (CSI) allows OFDM signaling to function in a manner that is well suited to the needs of the terrestrial broadcasting channel.

To combat frequency-selective fading and interference, channel coding with soft-decision decoding can be properly integrated with an OFDM system. By means of interleaving the coded data before assigning them to OFDM sub-carriers at the modulator, clusters of errors caused by channel impairment can be broken up at the receiving end. The soft-decision decoding is carried out by a well known Viterbi decoder in an OFDM receiver. The Viterbi decoder is a sort of maximum likelihood decoder for the convolutional coding and must be fed with a soft decision comprising a measure or metric of the received signal. A metric can be made separately for each received bit to indicate a degree of confidence.

When data are modulated onto a single carrier in a time-invariant system, then a priori all data symbols suffer from the same noise power on average; the soft-decision information simply needs to take note of the random symbol-by-symbol variations that this noise causes. When data are modulated onto the multiple OFDM sub-carriers, the metrics become slightly more complicated as the various carriers will have different signal-to-noise ratios (SNR). For example, a carrier which falls into a notch in the frequency response will comprise mostly noise; one in the peak will suffer much less. Thus, in addition to the symbol-by-symbol variations, there is another factor to take account for in soft decisions: data conveyed by sub-carriers having a high SNR are a priori more reliable than those conveyed by sub-carriers having low SNR. This priori information is usually known as channel-state information (CSI). The CSI concept can be extended to embrace interference which affects sub-carriers selectively. The inclusion of CSI in the generation of soft decisions is the key to the unique performance of OFDM in the presence of frequency-selective fading and interference One of the main advantages of OFDM is that each subcarrier experiences flat fading while the overall signal spectrum suffers from frequency-selective fading. Moreover, incorporating the concept of cyclic prefix (CP) prevents inter-symbol-interference (ISI) as long as the CP length is larger than the maximum delay of the channel. Consequently, low-complexity single-tap equalizers can be utilized to eliminate the impact of the multipath fading channel. Under such circumstances, the OFDM demodulation process can be performed once the fading parameters at each subcarrier channel state information (CSI), is known accurately. Towards this goal, robust channel estimation techniques should be invoked to avoid performance degradation.

Further, the issue of channel estimation has been considered extensively in the literature, the works reported in are just a few examples to mention. In general, channel estimation can be classified into blind, and pilot-aided techniques. Blind estimation techniques are spectrally efficient because they do not require any overhead to estimate the CSI. Nevertheless, such techniques have not been incorporated in practical OFDM systems yet. Pilot-based CSI estimation is preferred for practical systems because usually it is more robust and less complex. In pilot based CSI estimation, the pilot symbols are embedded within the subcarriers of the transmitted OFDM signal in time and frequency domain, hence the pilots form a two dimensional (2-D) grid. The density of the pilot symbols depends on the frequency-selectivity and time variation of the channel, or equivalently, the coherence bandwidth and coherence time of the channel. The channel response at the pilot symbols can be easily obtained using least square frequency domain estimation, the channel parameters at other subcarriers can be obtained using various interpolation techniques.

The density of the pilot grid and the interpolation technique used create a compromise between the error performance, spectral efficiency and the computational complexity. The spectral efficiency is determined by the grid density which has to satisfy the 2-D sampling theorem. The computational complexity is determined by the interpolation technique used, optimal interpolation requires a 2-D Wiener filter that exploits the time and frequency correlation of the channel, however it is substantially complex to implement. In time-varying channels, the spectral efficiency can be enhanced by changing the pilots' grid structure adaptively based on the channel conditions. The complexity can be reduced by decomposing the 2-D interpolation process into two cascaded 1-D processes, and then use less computationally involved interpolation schemes.

However, low complexity interpolation is usually accompanied with error performance degradation. It is also worth noting that most practical OFDM based systems utilize fixed grid pattern structure. Once the channel parameters are obtained for data subcarriers, the received samples at the output of the fast Fourier transform (FFT) are equalized to compensate for the channel fading. Fortunately, the equalization for OFDM is performed in frequency domain using single tap equalizers. The equalizer outputs, which are denoted as the decision variables, will be applied to a maximum likelihood detector (MLD) to regenerate the information symbols.

SUMMARY OF THE DISCLOSURE

In order to overcome the drawbacks of the conventional system, there is a need for a method, system and receiver for estimating transmitted signals over an OFDM communication system with efficient signal estimation techniques reducing/minimizing the steps of channel estimation, interpolation, equalization and detection operations. There is need for a system, method and receiver for reducing the number of pilots and hence improving the spectral efficiency of the system, which can be translated into a better network capacity.

In most conventional coherent digital receivers, extracting the information bits from the received signal with high reliability requires four essential steps (channel estimation at the pilot symbols, interpolation, equalization and data detection). However, applying the four steps to the received signal involves high complexity, error performance degradation, and reduction of spectral efficiency. In contrast to conventional receiver, the proposed system and method do not have any of these limitations because it performs data extraction in a single low complexity process.

In communication systems, the received signal suffers from amplitude attenuation and phase rotation. For example, FIG. 1 shows the received information bits affected by fading in a wireless channel. As it can be noted from the figure, the channel changes very smoothly over short time periods that consist of few information symbols. In other words, the channel values over adjacent subcarriers in the OFDM symbol are highly correlated.

Consequently, the present invention exploits this correlation feature to design a new system, method and receiver for estimating transmitted signals.

To simplify the explanation, assume that the transmitted symbols are composed of binary bits (+1, −1). Therefore, if we divide the received signal by a random sequence that is (by coincidence) equal to the originally transmitted signal, the result will be the channel response as shown in FIG. 2. If the trial sequence is not equal to the originally transmitted sequence, the result of the division will not be equal to the channel response. In fact, if the difference between the trial and original sequence is large, the division of the two sequences will generally look like the received signal in FIG. 1.

However, such process is not enough to estimate the correct sequence because the channel response itself is initially unknown at the receiver, and estimating the response is a highly complex process. Alternatively, the transmitted sequence can still be estimated with high level of confidence by exploiting the smoothness (correlation) property of the channel response over neighbored subcarriers, in particular, adjacent subcarriers. Therefore, a method in accordance with the present invention can be expressed as shown in the flowchart in FIG. 3.

As it can be noted from FIG. 3, the linear search process for the appropriate trial sequence (which would minimize the difference) can be highly complicated if the sequence length is large. Therefore, more efficient sequence detection techniques should be employed. In this sequel, the Viterbi Algorithm can be employed, which offers a significant complexity reduction. The Viterbi Algorithm is widely used in the in the literature due to its efficiency.

Unlike the conventional detection in OFDM systems, this invention proposes a new approach to regenerate the information symbols directly from the received samples at the FFT output. Consequently, there is no need to go through the channel estimation, interpolation, equalization and detection operations. The proposed system exploits the high channel correlation between adjacent subcarriers to estimate the transmitted data sequence. A conventional circuitry of a receiver in an OFDM communication system is provided in FIG. 5.

As a first aspect of the invention, there is provided a computer-implemented method of estimating transmitted signals in a communication system, the signals being transmitted by a transmitter to a receiver over a communication channel having a channel response, the method comprising estimating the transmitted signals based on generated trial sequences minimizing the channel response between adjacent received signals.

In an embodiment of the invention, the computer-implemented method comprises:
  generating trial sequences according to a sequence detection technique;
  dividing the received signals by the trial sequences for generating ratios between the received signals and the trial sequences;
  determining the trial sequences minimizing the difference between the ratios for adjacent signals;
  wherein the estimated transmitted signals are the equivalents of the trial sequences minimizing the difference between the ratios for the adjacent signals.

As a further aspect of the invention, there is provided a receiver comprising a signal detector for estimating transmitted signals in a communication system, the signals being transmitted by a transmitter to the receiver over a communication channel having a channel response, the signal detector being adapted to estimate the transmitted signals based on generated trial sequences minimizing the channel response between adjacent received signals.

In an embodiment of the invention, the signal detector is further adapted for: generating trial sequences according to a sequence detection technique;
   dividing the received signals by the trial sequences for generating ratios between the received signals and the trial sequences;
   determining the trial sequences minimizing the difference between the ratios for adjacent signals;
   wherein the estimated transmitted signals are the equivalents of the trial sequences minimizing the difference between the ratios for the adjacent signals.

As a another aspect of the invention, there is provided a signal detector device comprising a processing unit for estimating transmitted signals in a communication system, the signals being transmitted by a transmitter to a receiver over a communication channel having a channel response, the signal detector device being adapted to estimate the transmitted signals based on generated trial sequences minimizing the channel response between adjacent received signals.

In an embodiment of the invention, the signal detector device is further adapted to:
   generate trial sequences according to a sequence detection technique;
   divide the received signals by the trial sequences for generating ratios between the received signals and the trial sequences;
   determine the trial sequences minimizing the difference between the ratios for adjacent signals;
   wherein the estimated transmitted signals are the equivalents of the trial sequences minimizing the difference between the ratios for the adjacent signals.

As a further aspect of the invention, there is provided a communication system comprising:
   a transmitter for transmitting signals;
   a receiver for receiving the signals;
   a signal detector adapted to be connected to the receiver for estimating the transmitted signals, the signals being transmitted by the transmitter to the receiver over a communication channel having a channel response, the signal detector being adapted to estimate the transmitted signals based on generated trial sequences minimizing the channel response between adjacent received signals.

In an embodiment of the invention, the signal detector of the communication system is further adapted to:
   generate trial sequences according to a sequence detection technique;
   divide the received signals by the trial sequences for generating ratios between the received signals and the trial sequences;
   determine the trial sequences minimizing the difference between the ratios for adjacent signals;
   wherein the estimated transmitted signals are the equivalents of the trial sequences minimizing the difference between the ratios for the adjacent signals.

In an embodiment of the invention, the adjacent signals are consecutive in frequency. Frequency-consecutive signals are preferably used when the channel is a time selective channel. In another embodiment, the adjacent signals are a same frequency signals but they are consecutive in time. This can be used for example where the channel is a frequency selective channel. In another embodiment, the signals are consecutive and adjacent OFDM signals In an embodiment of the invention, the adjacent signals are consecutive signals. Consecutive signals are preferably used when the channel is a time selective channel. In another embodiment, the adjacent signals are a same frequency signals but not necessarily consecutive in time. This can be used for example where the channel is a frequency selective channel. In another embodiment, the signals are consecutive and adjacent OFDM signals.

In an embodiment of the invention, the consecutive signals are 2 consecutive signals. Alternatively, more than 2 consecutive signals can be taken, however this would involve more complex mathematical compilations.

In an embodiment of the invention, the sequence detection technique comprises a linear search process.

In an embodiment of the invention, the sequence detection technique comprises a Viterbi search process.

In an embodiment of the invention, the transmitted signals are modulated using a modulation type prior to transmission, and wherein the trial sequences are generated based on the modulation type.

The modulation type can be any type of modulation, including but not limited to QAM and PSK modulation such as BPSK, 8-PSK, 16-PSK, 32-PSK, 64-PSK, 4-QAM, 16-QAM, etc. The modulation type can be any modulation type known a priori by the signal detector.

In an embodiment of the invention, the received signals comprise pilot symbols, and wherein the method further comprises using the pilot symbols to clear phase ambiguities in the estimated signals.

Preferably, the communication system is an OFDM communication system, the receiver is an OFDM receiver, the transmitter is an OFDM transmitter and the transmitted signals are OFDM signals. However, the signal detector can also work in other types of communication systems.

In an embodiment of the invention, the channel is a Rayleigh fading channel. The channel can also be Gaussian, Ricean, Nakagami, or any other wireless channel model.

The communication system can be a wire or wireless communication system, and the channel can be a wire or wireless communication channel.

The proposed method, receiver and system can be considered as a revolutionary approach for data recovery in digital communication systems. In traditional receivers, the data recovery process comprises several stages such as channel estimation, equalization and detection. These operations usually require considerable computational power, and may involve symbol pilot insertion, which reduces the system spectral efficiency. The complexity, system error performance and spectral efficiency are conflicting parameters in traditional systems because improving one parameter degrades the others. For example, improving the error performance requires accurate channel estimation, which can be achieved using sophisticated blind channel estimation techniques, which increases the system complexity. Or, one can use pilot based channel estimation with high pilot density, which deteriorates the spectral efficiency.

The new invention breaks the ties between the three performance metrics because the three main operations performed at the receiver are combined in just one low complexity operation. Consequently, there is no need to trade one performance metric with other metrics.

This together with the other aspects of the present invention along with the various features of novelty that characterized the present disclosure is pointed out with particularity in claims annexed hereto and forms a part of the present invention. For better understanding of the present disclosure, its operating advantages, and the specified objective attained by its uses, reference should be made to the accompanying descriptive matter in which there are illustrated exemplary embodiments of the present invention.

BRIEF DESCRIPTION OF THE DRAWINGS

The advantages and features of the present disclosure will become better understood with reference to the following detailed description and claims taken in conjunction with the accompanying drawing, in which:

DETAILED DESCRIPTION OF THE DISCLOSURE

The foregoing descriptions of specific embodiments of the present disclosure have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

The terms "a" and "an" herein do not denote a limitation of quantity, but rather denote the presence of at least one of the referenced item.

The terms "having", "comprising", "including", and variations thereof signify the presence of a component.

The present invention provides an efficient receiver for extracting data in an OFDM communication system (hereinafter interchangeably called as "system" or "Direct Data Detection" or "$D^3$").

In an embodiment of the present invention, an OFDM communication system refers to a system in which encoding of digital data is done on multiple carrier frequencies. A large number of closely spaced orthogonal sub-carrier signals are used to carry data on several parallel data streams or channels. Each sub-carrier is modulated with a conventional modulation scheme (such as quadrature amplitude modulation or phase-shift keying) at a low symbol rate, maintaining total data rates similar to conventional single-carrier modulation schemes in the same bandwidth.

In an embodiment of the present invention, a receiver is referred to be an electronic device that receives radio waves and converts information carried by the waves into usable form.

Figure 1:
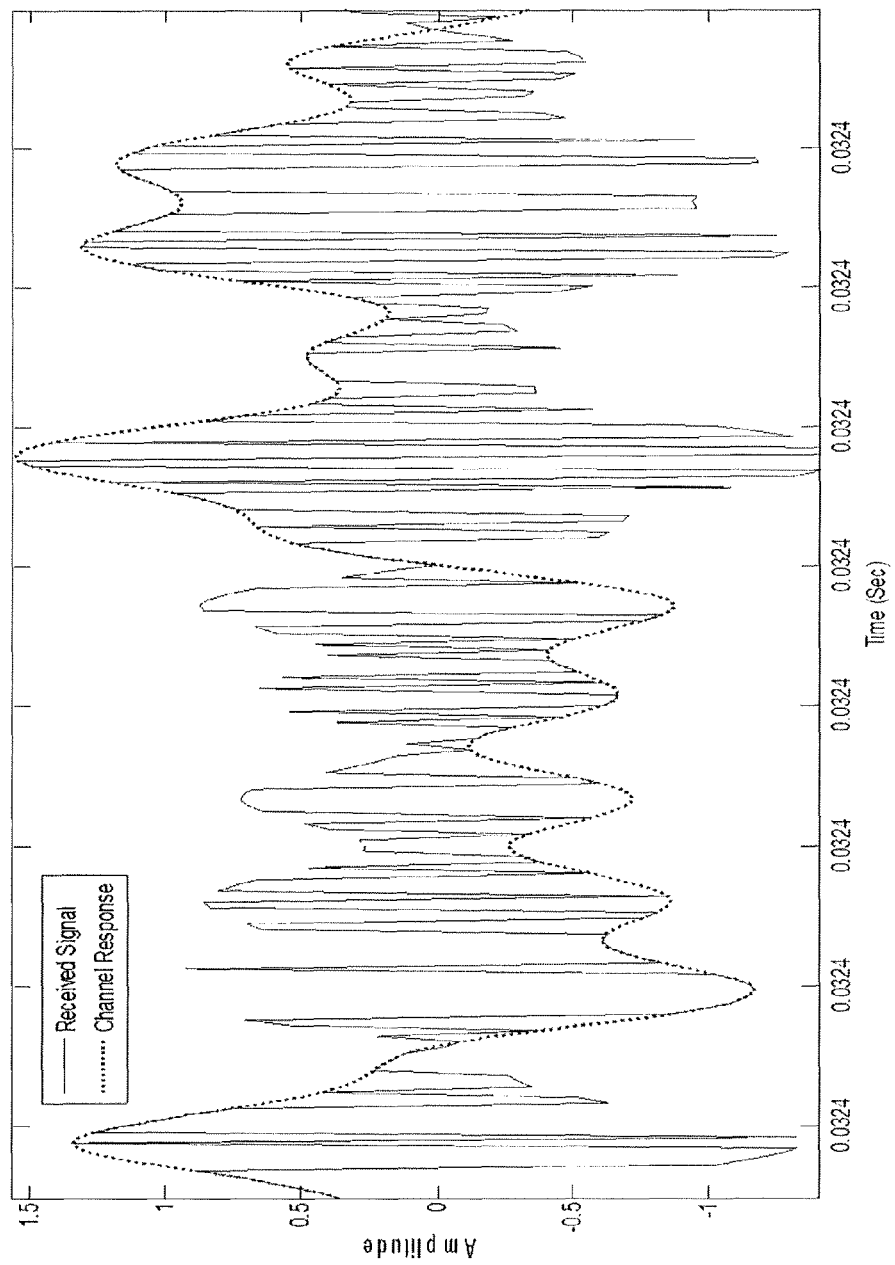
FIG. 1 illustrates a received signal in a fading channel.
Figure 2:
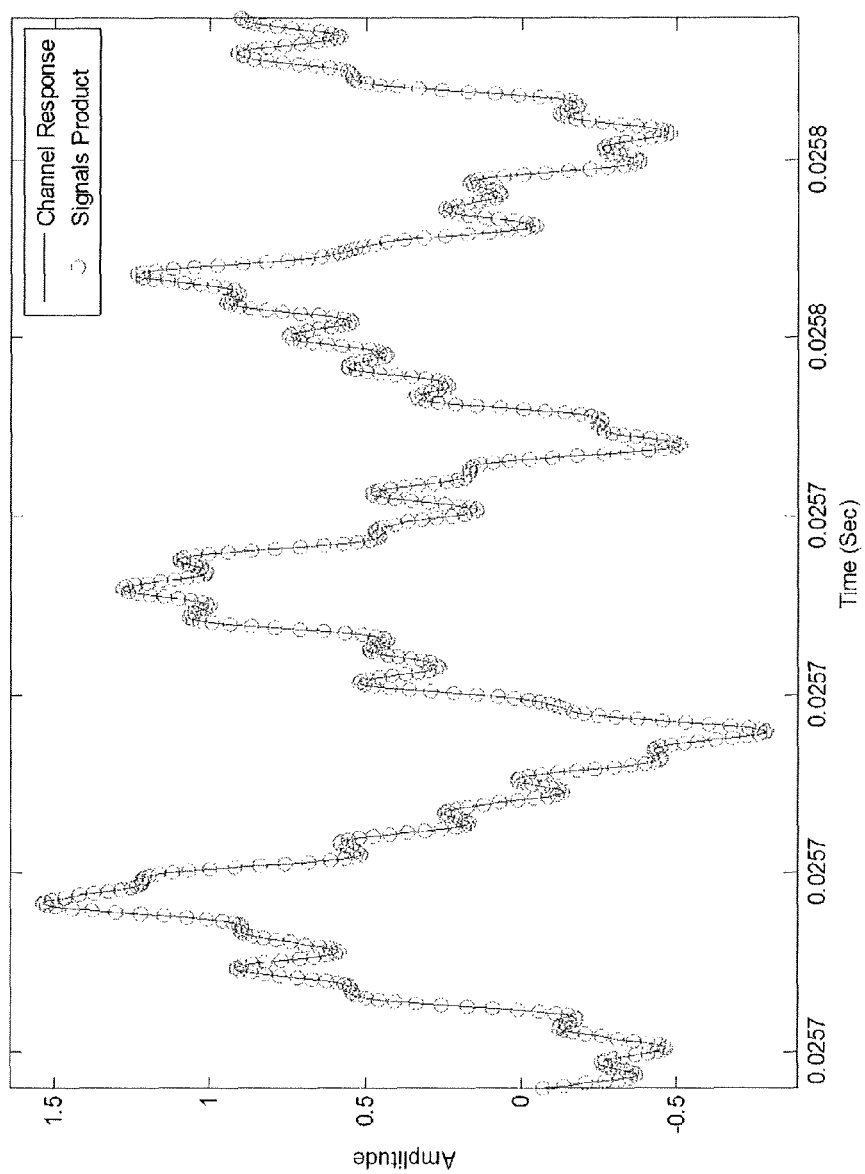
FIG. 2 illustrates a product of the received signal with the correct trial sequence.
Figure 3:
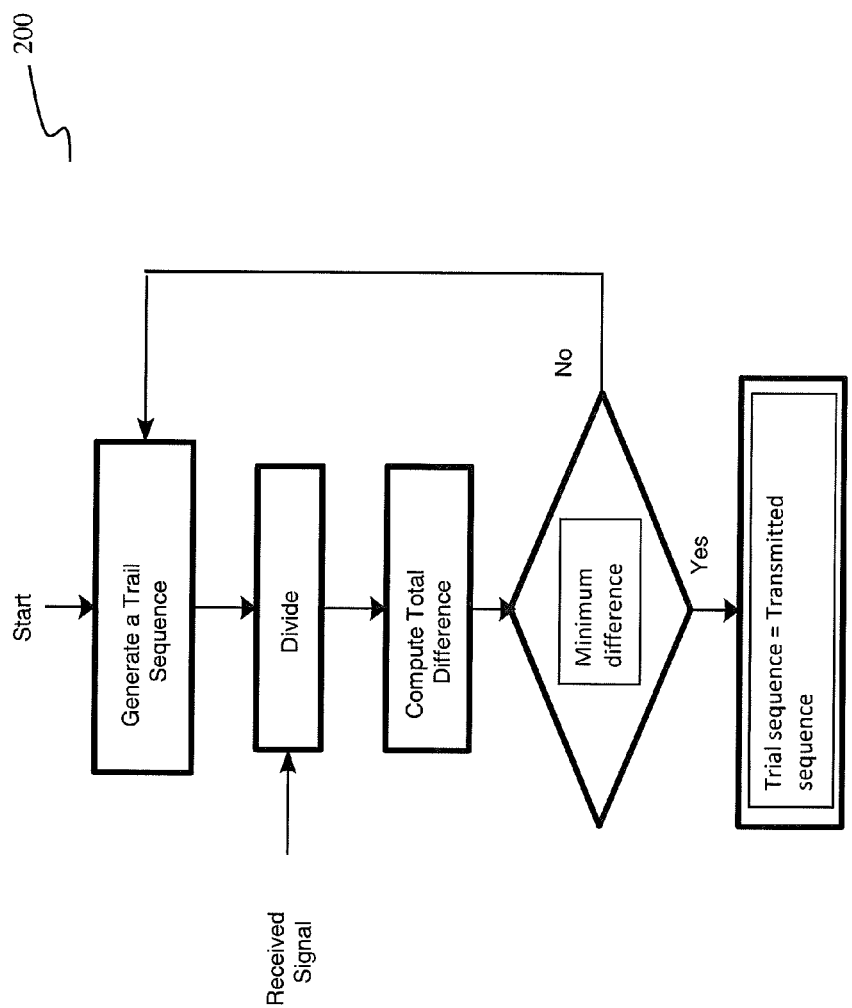
FIG. 3 illustrates a method of estimating a transmitted signal in an OFDM communication system in accordance with an embodiment of the present invention.
Figure 4:
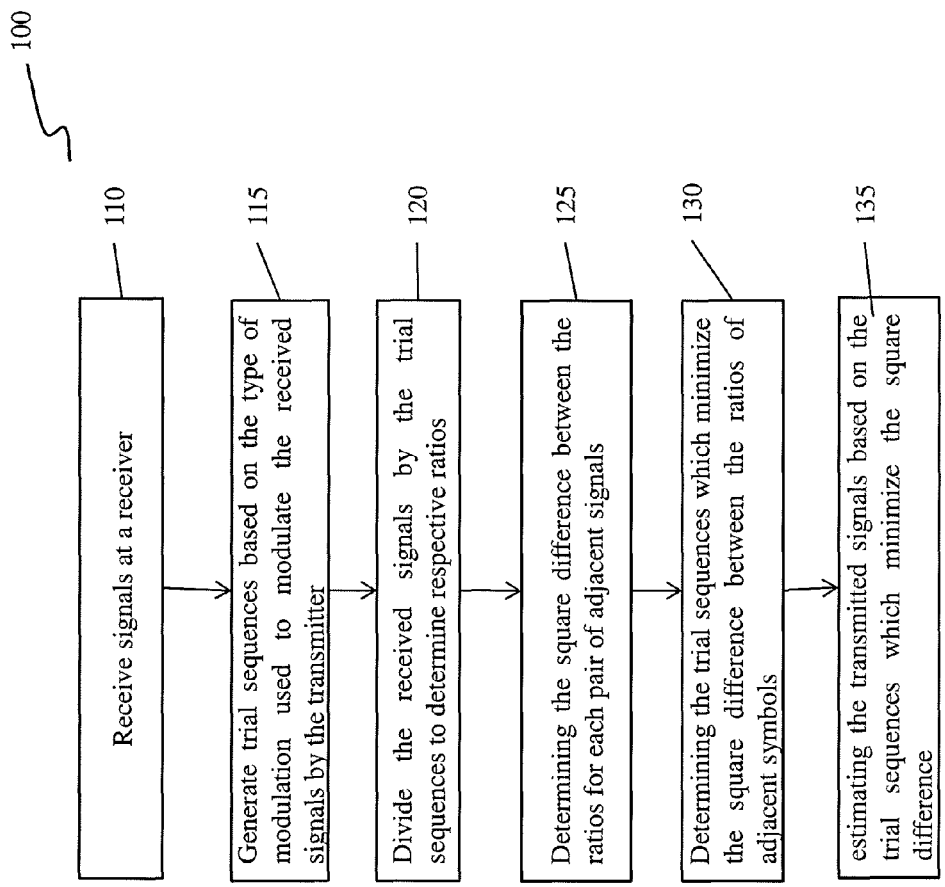
FIG. 4 illustrates a method of estimating a transmitted signal in an OFDM communication system in accordance with another embodiment of the present invention.

Referring to FIGS. 3 and 4, in one aspect, the present invention provides a computer-implemented method 100 or 200 for estimating transmitted signals in a communication system, preferably an OFDM communication system. The method is adapted to receive signals communicated over the OFDM communication system and to estimate a sequence of transmitted signals by the OFDM communication system based on the minimization of the channel response between adjacent symbols. This is as the channel response is quasi static between adjacent symbols. In an embodiment of the invention, the method is adapted to generate trial sequences (115) and to divide the received signals by the trial sequences to generate ratios between the received signals and the trial sequences (120), then determine the difference between the ratios of consecutive signals (125), then determine the trial sequences which minimize the difference between the ratios for adjacent symbols (130). The transmitted signals are then estimated based on these trial sequences determined to minimize the difference between the rations of adjacent symbols (135).

Preferably, the method takes two consecutive signals, divides each signal by one trial sequence to determine respective ratios, determines the difference between the ratios and determines which trial sequences minimize the difference between the ratios for each pair of adjacent symbols. Preferably, the square difference between the ratios of each pair of two consecutive symbols is compiled. The estimated transmitted signals determined by the method are those equivalents to the trial sequences minimizing the square difference between the ratios determined for two consecutive signals. Ideally, the square difference would be zero when the trial sequences used are equivalent to the signals being transmitted. This is equivalent to estimating the transmitted signals by minimizing the channel response between two adjacent symbols. The trial sequences are generated based on the type of modulation used at the transmitter side which is known a priori by the receiver. For example, for a BPSK modulation, the trial sequences are 00, 01, 10 and 11. For each pair of adjacent symbols, the method is adapted to determine which trial sequences minimize the square difference of the respective ratios.

The present invention also provides a system for estimating transmitted signals in a communication system, preferably an OFDM communication system. The system is adapted to estimate transmitted signals by executing the method of the present invention. In an embodiment of the invention, the system comprises a signal detector adapted to run on a microprocessor for receiving signals communicated over the OFDM communication system, generating trial sequences, dividing the received signals by the trial sequences for estimating corresponding ratios, compiling the difference between the ratios for each pair of adjacent signals, and estimating the transmitted signals by minimizing the difference of the ratios of two consecutive signals (which is equivalent to the minimization of the channel response between two consecutive signals). The trial sequences are generated based on the type of modulation used at the transmitter side which is known a priori by the receiver.

In an embodiment of the invention, the system is a communication system further comprising a transmitter and a receiver, preferably an OFDM communication system.

The invention further provides a communication receiver comprising a signal detector adapted to execute the method of the present invention. In an embodiment of the invention, the signal detector is adapted for receiving signals received by the receiver, generating trial sequences, dividing the received signals by the trial sequences for estimating corresponding ratios, compiling the difference between the ratios for each pair of adjacent signals, and estimating the transmitted signals by minimizing the difference of the ratios of two consecutive signals (which is equivalent to the minimization of the channel response between two consecutive signals). The trial sequences are preferably generated based on the type of modulation used at the transmitter side which is known a priori by the receiver. In an embodiment of the invention, the receiver is an OFDM receiver.

The invention further provides a signal detector device comprising a processing unit adapted to execute the method of the present invention.

In an embodiment of the invention, the adjacent signals are consecutive signals. Consecutive signals are preferably used when the channel is a time selective channel. In another embodiment, the adjacent signals are a same frequency signals but not necessarily consecutive in time. This can be used for example where the channel is a frequency selective channel. In another embodiment, the signals are consecutive and adjacent OFDM signals.

In an embodiment of the invention, the consecutive signals are 2 consecutive signals. Alternatively, more than 2 consecutive signals can be taken, however this would involve more complex mathematical compilations.

In an embodiment of the invention, the sequence detection technique comprises a linear search process.

In an embodiment of the invention, the sequence detection technique comprises a Viterbi search process.

In an embodiment of the invention, the transmitted signals are modulated using a modulation type prior to transmission, and wherein the trial sequences are generated based on the modulation type.

In an embodiment of the invention, the modulation type is BPSK, 8-PSK, 16-PSK, 32-PSK or 64-PSK. The modulation type can also be any other modulation type known a priori by the signal detector.

In an embodiment of the invention, the received signals comprise pilot symbols, and wherein the method further comprises using the pilot symbols to clear phase ambiguities in the estimated signals.

Preferably, the communication system is an OFDM communication system, the receiver is an OFDM receiver, the transmitter is an OFDM transmitter and the transmitted signals are OFDM signals. However, the signal detector can also work in other types of communication systems.

In an embodiment of the invention, the channel is a Rayleigh fading channel. The channel can also be Gaussian, Ricean, Nakagami, or any other channel model The communication system can be a wire or wireless communication system, and the channel can be a wire or wireless communication channel.

In an exemplary embodiment of the present invention, the method of extracting information from received signals is being explained in conjunction with the OFDM model in terms of mathematical expressions.

OFDM Model:

Consider an OFDM system with N subcarriers modulation by a sequence of N complex symbols during the lth OFDM block $d^l=[d_0^l, d_1^l, \ldots, d_{N-1}^l]^T$. The data symbols are selected uniformly from a general constellation such as M-ary phase shift keying (MPSK) or M-ary quadrature amplitude modulation (M-QAM). In most practical systems, the vector dc is composed of a combination of data and pilot symbols whose values and locations are known for the receiver. Assuming that the pilots are equally spaced within the OFDM block, which is usually the case, the pilots vector can be expressed as $$\Phi^l = [\Phi_0, \Phi_1, \ldots, \Phi_{K_{sym}-1}]^T = [d_i^l, d_{i+1+\Delta_F}^l, d_{i+2(\Delta_F+1)}^l, \ldots, d_{i+(K_{sym}-1)\Delta_F+K_{sym}}^l]^T, \quad 0 \leq i+(K_{sym}-1)\Delta_F+K_{sym} \leq N \quad (1)$$

where $K_{sym}$ is the total number of pilots per OFDM, $\Delta_F$ is the subcarrier separation between consecutive pilot symbols, and i determines the index of the first pilot symbol. The values of $K_{sym}$, i and $\Delta_F$ for each OFDM block depend on the particular system and its is a function of l.

Figure 5:
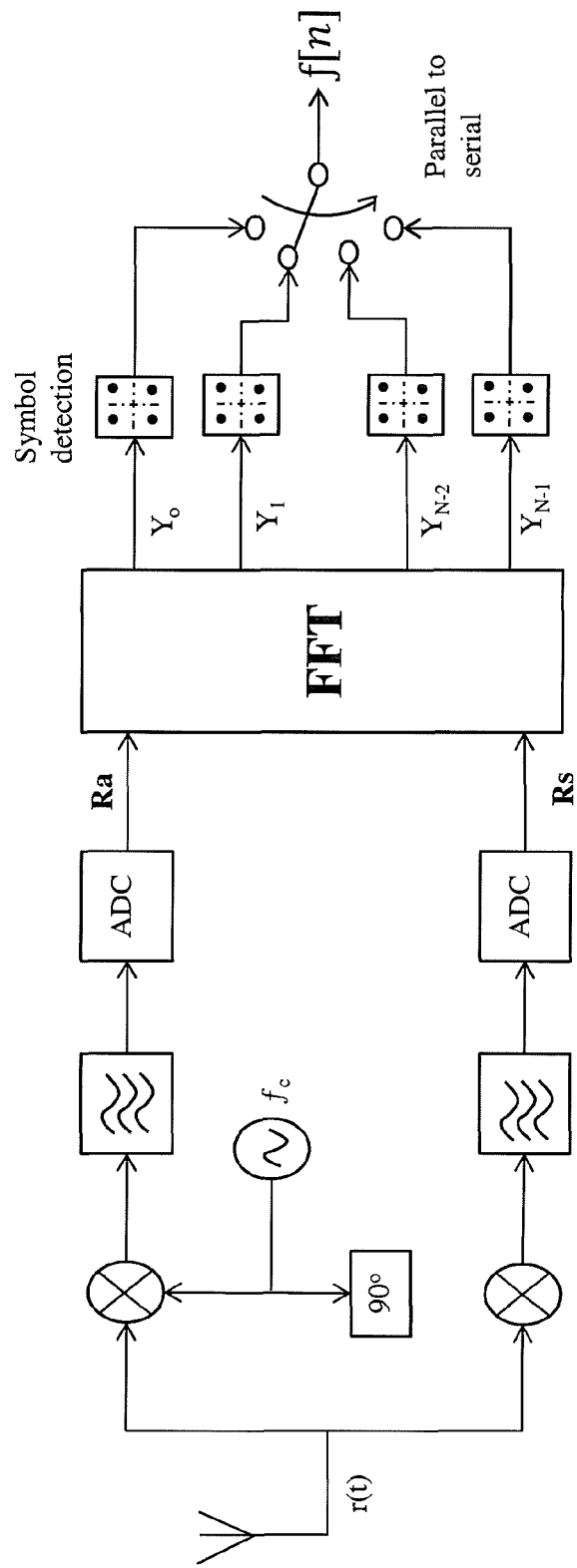
FIG. 5 illustrates a block diagram of a conventional circuitry of a receiver in an OFDM communication system, according to various embodiments of the present invention.
Figure 7A:
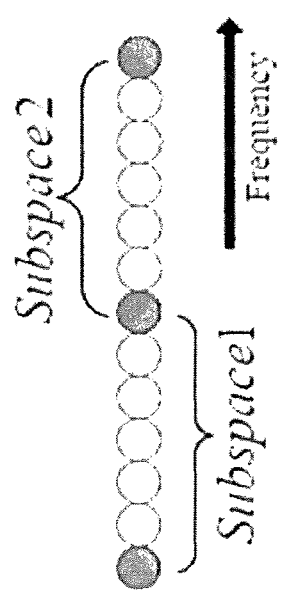
FIG. 7a show a first search space partitioning in an OFDM communication system.
Figure 7B:
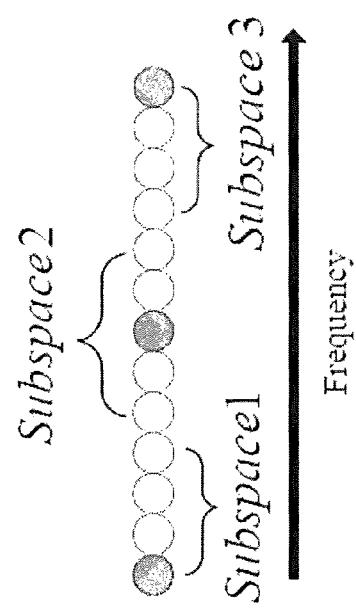
FIG. 7b show a second search space partitioning in an OFDM communication system.

FIG. 5 shows LTE-A symbol structures within a resource block with one antenna and normal CP. The solid circle represents the pilot symbols. FIGS. 7a and 7b shows a first search space partitioning and a second search space partitioning respectively.

The modulation process can be implemented efficiently using N points inverse FFT (IFFT). The output of IFFT process during the lth OFDM is given by, $$x^l = F^H d^l, \quad (2)$$

where $F^H$ is the normalized N×N IFFT matrix. The elements of the $F^H$ are defined as $\mathcal{F}_{i,k}^H = (1/\sqrt{N})e^{j2\pi ik/N}$ where i and k denote the row and column numbers $\{i,k\}=0, 1, \ldots, N-1$, respectively. Note that $F^{-1}=F^H$ because F is unitary matrix. If the OFDM symbol is dropped for notational conciseness, the nth sample in the sequence x can be expressed as $$x_n = \frac{1}{\sqrt{N}} \sum_{i=0}^{N-1} d_i e^{\frac{j2\pi in}{N}}, n = 0, 1, \ldots, N-1. \quad (3)$$

To eliminate the ISI between consecutive OFDM symbols and maintain the subcarriers' orthogonality in frequency-selective multipath fading channels, a CP of length P samples no less that the channel delay spread ($L_h$) is formed by copying the last N samples of x and appending them in front of the IFFT output to compose the OFDM symbol with a total length $N_t = N+P$ samples and a duration of $T_t$ seconds. Hence, the complex baseband OFDM symbol during the lth signaling period can be expressed as $$x^{cp} = [x_{N-P}, x_{N-P+1}, \ldots, x_{N-1}, x_0, x_1, \ldots, x_{N-1}]^T. \quad (4)$$

Consequently, the ith transmitted sample is given by $$x_i^{cp} = x \langle_{i-P}\rangle_N, i=0,1,\ldots,N_t-1, \quad (5)$$

where $\langle i \rangle_k$ i mod k. The sequence $x^{cp}$ is unsampled, filter and up-converted to a radio frequency centered at $f_c$ before transmission through the antenna.

At the receiver front-end, the received signal is down-converted to base band and sampled at a rate $T_s = T_t/N_t$. In this work we assume that the channel is composed of $L_h+1$ independent multipath components each of which has a gain $h_m$ and delay $m \times T_s$, where $m \in \{0, 1, \ldots, L_h\}$. The channels tap are assumed to be constant over one OFDM symbol and changes slowly over two consecutive symbols, which corresponds to a quasi static multipath channel. The received sequence $y^{cp}$ consists of $N_t$ samples, and it can be expressed as $$y^{cp} = \mathbb{H}^{cp} x^{cp} + z^{cp}, \quad (6)$$

where the channel matrix $\mathbb{H}^{cp}$ is an $N_t \times N_t$ Toeplitz matrix with $h_0$ on the principal diagonal and $h_1, \ldots, h_{L_h}$ on the minor diagonals, respectively, the noise vector $z^{cp}$ is modeled as white Gaussian noise process with zero mean and variance $\sigma_z^2 = E[|z_n|^2]$. The received samples that belong to a single OFDM symbol can be expressed as $$y^{cp} = [c_0, c_1, \ldots, c_{P-1}, y_0, y_1, \ldots, y_{N-1}], \quad (7)$$

where $c_i$ represents CP samples. The non CP samples $\{y_n\}$ will be referred to as the data samples, which can be expressed as $$y_n = \sum_{m=0}^{L_h} h_m x_{\langle n-m \rangle_N} + z_n, n = 0, 1, \ldots, N-1. \quad (8)$$

Subsequently, the receiver should identify the sequence $y = [y_0, y_1, \ldots y_{N-1}]$ and discard the P CP samples, then the FFT of y is computed where, $$y = \mathbb{H} x + z, \quad (9)$$

and where the channel matrix i is an N×N circular matrix. Therefore, the FFT output can be computed as $$s = Fy = F\mathbb{H} F^H d + \mathcal{F} z. \quad (10)$$

Moreover, because the matrix $\mathbb{H}$ is circulant, it will be diagonalized by the FFT and IFFT matrices. Hence, $$s = Hd + \eta, \quad (11)$$

where $\eta$ is the FFT of the noise vector z, H denotes the channel frequency response $$H = \text{diag}([H_0, H_1, \ldots, H_{N-1}]), \quad (12)$$

and $H_k = \sum_{m=0}^{L_h} h_m e^{-2\pi mk/N}$ represents the channel response in frequency domain.

The decision variables vector r can be obtained by equalizing s using an estimated version of H, denoted as $\hat{H}$. Assuming zero-forcing equalizer, then $$r = [\hat{H}^H \hat{H}]^{-1} \hat{H}^* s. \quad (13)$$

Finally, the vector r is fed to a maximum likelihood detector to recover the information symbols. Assuming that the data source is memoryless, then symbol detection can be performed on the symbol-by-symbol bases. Thus, the $k^{th}$ element in d is given by $$\hat{d}_k = \underset{\tilde{d}_i}{\text{argmin}} |r_k - \tilde{d}_i|^2, i = 0, 1, \ldots, M-1. \quad (14)$$

However, the elements of $\hat{H}$ are initially unknown, hence they must be estimated. The first step towards computing $\hat{H}$ is to compute $\hat{H}_{i,i}, \hat{H}_{i+\Delta_F, i+\Delta_F}, \ldots, \hat{H}_{i+l\Delta, i+l\Delta}$, which can be easily performed for the pilot subcarriers using the least square (LS) criterion [18], where $$\hat{H}_{u,u} = \frac{s_u}{d_u}, u \in \{i, i+\Delta_F, \ldots, i+l\Delta\} \quad (15)$$

$$= H_{u,u} + \frac{n_u}{d_u}.$$

The remaining elements of $\hat{H}$ can be obtained using a particular interpolation function.

The Proposed $D^3$:

Due to the nature of the multipath fading channels, the element of the channel matrix H can be considered as zero means jointly complex Gaussian random variable. Assuming that the channel is following the Jake's model, the correlations can be expressed as $$E[H_n H_m^*] = \frac{1}{1 - j2\pi\sigma(n-m)} \quad (16)$$

where $\sigma$ is the mean delay spread of the channel and $E[.]$ denotes the expectation process. As it can be noted from (16), where $|n-m|=1$, the channel coefficients over adjacent subcarriers are highly correlated where $E[H_n^l (H_m^l)] \approx 1$ Similarly, the channel variations over time can be described using the Jake's model as well. Assuming that the channel is Rayleigh fading with independent multipath components, the time correlation can be expressed as, $$E\left[h_l^{(n)} \check{h}_{\bar{l}}^{(m)}\right] = \begin{cases} \beta_l J_0\left(2\pi f_d \frac{T_u}{N}(n-m)\right), & l = \bar{l} \\ 0, & \text{otherwise} \end{cases} \quad (17)$$

where $$\frac{T_u}{N} = T_s = T_t/(N+P), \beta_l$$

is the normalized power of the lth multipath component $\sum_{l=0}^{L_h} \beta_l = 1$, $J_0(.)$ is the Bessel function of the first kind and zero order $f_d$ is the maximum Doppler shift.

Therefore the time variations over the channel matrices $H^l$ and $H^{l+1}$ in two consecutive OFDM symbols are small as well, $[H_n^l (H_n^{l+1})] \approx 1$. It is worth noting that these features can be exploited to derive efficient carrier frequency offset (CFO) estimators by minimizing the power difference between adjacent subcarriers within the same OFDM symbol, or between two subcarriers with the same index in two consecutive OFDM symbols.

The present invention exploits the correlation between adjacent and consecutive subcarriers to perform direct data detection such that the estimated data matrix $\hat{D} = [\hat{d}_0, \hat{d}_1 \ldots, \hat{d}^{\mathcal{L}-1}]$ is obtained by minimizing $$\hat{D} = \underset{\tilde{D}}{\text{argmin}} J(\tilde{D}) \quad (18)$$

where $$J(\tilde{D}) = \sum_{l=0}^{\mathcal{L}-1} \sum_{k=0}^{N-2} \left|\frac{s_k^l}{\tilde{d}_k^l} - \frac{s_{k+1}^l}{\tilde{d}_{k+1}^l}\right|^2 + \left|\frac{s_k^l}{\tilde{d}_k^l} - \frac{s_k^{l+1}}{\tilde{d}_k^{l+1}}\right|^2. \quad (19)$$

As it can be noted from (18), solving for $\hat{D}$ requires $M^{N \times (\mathcal{L}+1)}$ trials if brute force solution is adopted. Moreover, it can be noted from (18) that there is $$a\frac{2\pi}{M}$$

phase ambiguity. For example, if M=2, the cost function can be minimized when $\tilde{D}=D$ or $\tilde{D}=-D$.

Example 1

Consider the simple case where N=2 and $\mathbb{H}$=1, and assume that BPSK is adopted. Thus $$J(\tilde{D}) = \left|\frac{s_0^0}{\tilde{d}_0^0} - \frac{s_1^0}{\tilde{d}_1^0}\right|^2 + \left|\frac{s_0^1}{\tilde{d}_0^1} - \frac{s_1^1}{\tilde{d}_1^1}\right|^2 + \left|\frac{s_0^0}{\tilde{d}_0^0} - \frac{s_0^1}{\tilde{d}_0^1}\right|^2 + \left|\frac{s_1^0}{\tilde{d}_1^0} - \frac{s_1^1}{\tilde{d}_1^1}\right|^2, \quad (20)$$

where $$\tilde{D} = \begin{bmatrix} \tilde{d}_0^0 & \tilde{d}_1^0 \\ \tilde{d}_0^1 & \tilde{d}_1^1 \end{bmatrix}.$$

If we ignore the AWGN, then $s_k^l = H_k^l d_k^l$. Moreover, under the time and frequency domain correlation assumptions we can assume that $H_k^l \approx H_{k+1}^l \triangleq B_k^l$ and $H_k^l \approx H_k^{l+1} \triangleq C_k^l$. Consequently, the solution can be formulated as $$J(\tilde{D}) = \left|B_0^0\left(\frac{d_0^0}{\tilde{d}_0^0} - \frac{d_1^0}{\tilde{d}_1^0}\right)\right|^2 + \quad (21)$$

$$\left|B_0^1\left(\frac{d_0^1}{\tilde{d}_0^1} - \frac{d_1^1}{\tilde{d}_1^1}\right)\right|^2 + \left|C_0^1\left(\frac{d_0^0}{\tilde{d}_0^0} - \frac{d_0^1}{\tilde{d}_0^1}\right)\right|^2 + \left|C_1^1\left(\frac{s_1^0}{\tilde{d}_1^0} - \frac{s_1^1}{\tilde{d}_1^1}\right)\right|^2.$$

By dropping the irrelevant constant we obtain $$J(\tilde{D}) = \left|\left(\frac{d_0^0}{\tilde{d}_0^0} - \frac{d_1^0}{\tilde{d}_1^0}\right)\right|^2 + \left|\left(\frac{d_0^1}{\tilde{d}_0^1} - \frac{d_1^1}{\tilde{d}_1^1}\right)\right|^2 + \left|\left(\frac{d_0^0}{\tilde{d}_0^0} - \frac{d_0^1}{\tilde{d}_0^1}\right)\right|^2 + \left|\left(\frac{s_1^0}{\tilde{d}_1^0} - \frac{s_1^1}{\tilde{d}_1^1}\right)\right|^2. \quad (22)$$

Therefore, $J(\tilde{D})=0$ for given that $\tilde{D}=D$ or $\tilde{D}=-D$. The phase ambiguity problem can be resolved if at least one of the element in D is a pilot symbol regardless the size of D.

The above explained mathematical process is a mere example for implementing the method of the present invention and should not be considered as a limitation to the present invention.

Reduced Complexity $D^3$ for Practical OFDM Systems:

As it can be noted from (18), exhaustive search is prohibitively expensive due to the large number of trials required to find $\hat{D}$. Therefore, more efficient detector architecture is needed. The most common approach in such scenarios is to partition the 2-D search process into two 1-D search operations, one in frequency domain, and one in time domain.

Figure 6:
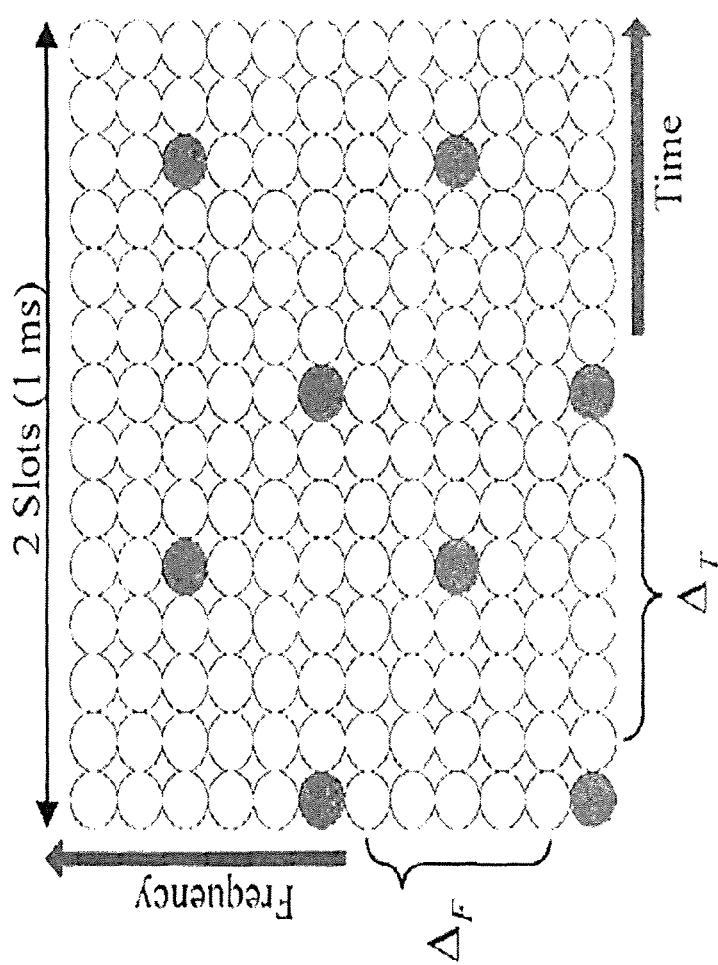
FIG. 6 shows LTE-A symbol structures within a resource block with one antenna and normal CP in an OFDM communication system. The solid circle represents the pilot symbols.

Moreover, in most practical OFDM systems, the symbol structure have some pilot symbols embedded within the data subcarriers for channel estimation and synchronization purposes as shown in FIG. 6 for the LTE-A scenario. Such structure actually enables the design of a reduced complexity detector by reducing the frequency domain search space itself by partitioning the vector d into a smaller set of sub-vectors each of which composed of a few data symbols. To simplify the phase ambiguity resolution, each search subspace should include at least one pilot symbol. An example for the frequency domain subspace partitioning is given in FIG. 7a. In this example, the search space can be divided into $K_{sym}-1$ sectors, each sector is bounded by two pilot symbols from the left and right sides. As an example, consider an OFDM system with pilot structure as described in (1). Given that i=0, the pilots will be located at subcarriers $0, \Delta_F+1, \ldots, (K_{sym}-1)\Delta_F+K_{sym}$.

Therefore, the first search sector includes subcarriers $[0, 1, \ldots, \Delta_F+1]$. The second sector includes subcarriers $[\Delta_F+1, \Delta_F+2, \ldots, 2(\Delta_F+1)]$, the remaining sectors are constructed similarly. The value of $\Delta_F$ is generally small for most practical applications, for example, the normal SISO mode LTE-A has $\Delta_F=5$ while DVB-T systems have $\Delta_F=11$.

It is interesting to note that placing the pilot symbols at the edges of the search sequences brackets the correlation among the sectors of the trial vector $\tilde{d}$. Therefore performing the search over the full vector in one shot, or over the sub-vectors will not make any difference with respect to the system error performance.

Figure 8:
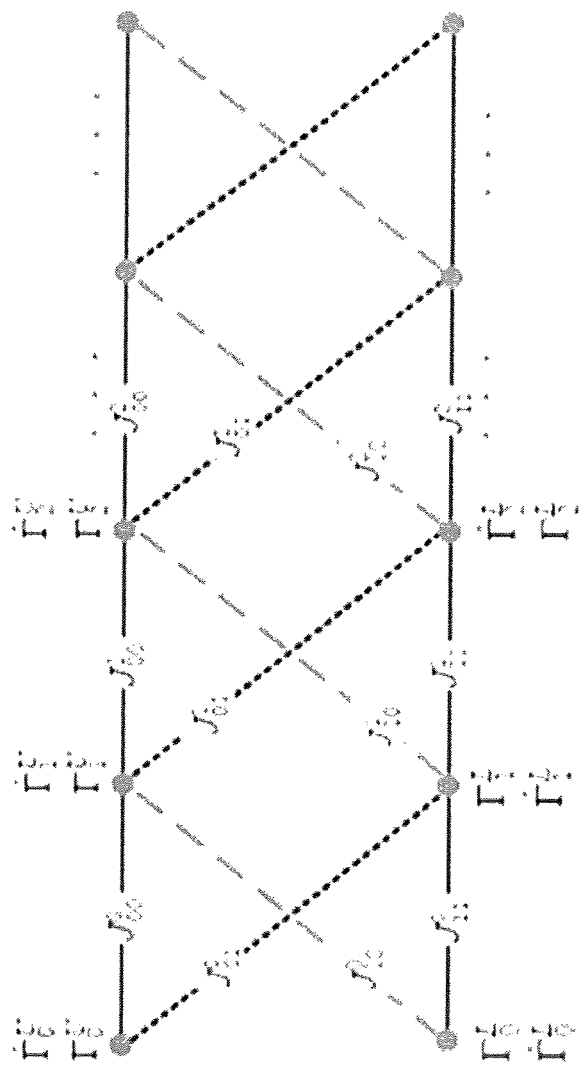
FIG. 8 is a trellis diagram for the Viterbi decoding of the proposed detector using BPSK.

As an example, the detection of the data in the first sector in FIGS. 7a and 7b can be expressed as, $$\hat{d}_{[1\to 5]} = \arg\min_{\tilde{d}} \sum_{k=0}^{5} \left|\frac{s_k}{\tilde{d}_k} - \frac{s_{k+1}}{\tilde{d}_{k+1}}\right|^2, \quad (23)$$

Where $\tilde{d}_0 = d_0$ and $\tilde{d}_6 = d_6$ which are the pilot symbols. Moreover, it can be noted from (23) that the cost function is computed as the sum of correlated arguments. Such a process can be considered as a first order Markov chain. Consequently, maximum likelihood sequence detection (MLSD) methods can be employed to estimate the transmitted sequence efficiently. In this work we adopt the Viterbi Algorithm because it is optimal and computationally efficient. The trellis diagram for the $D^3$ using BPSK modulation can be constructed as shown in FIG. 8. The detection process can be explained as follows:

1) Set the initial path metrics $\{\Gamma_0^U, \Gamma_0^{'U}, \Gamma_0^L, \Gamma_0^{'L}\}=0$, where the superscripts U and L are used to denote the upper and lower states in the trellis. Because we are considering BPSK modulation, and the detectors exhibit first order memory, the number of states in the trellis is only two.
2) Set a counter c=0.
3) Compute the branch metrics $J_{mn}^c$, where m denotes the value of the current symbol where $-1 \to 0$ and $1 \to 1$, n is the value of the next symbol with similar mapping, and c is the step number at which the branch metrics are computed.
4) Compute the path metrics $$\Gamma_{c+1}^U = \min[\Gamma_c^U, \Gamma_c^{'U}] + J_{00}^c$$

$$\Gamma_{c+1}^{'U} = \min[\Gamma_c^U, \Gamma_c^{'U}] + J_{10}^c$$

$$\Gamma_{c+1}^L = \min[\Gamma_c^L, \Gamma_c^{'L}] + J_{01}^c$$

$$\Gamma_{c+1}^{'L} = \min[\Gamma_c^L, \Gamma_c^{'L}] + J_{11}^c$$

5) c=c+1.
6) if $c=c_{max}$, end, else, go to step 3. Because the data vector d can be segmented into a number of sub-vectors, the Viterbi algorithm can be applied in parallel to all sub-vectors simultaneously, which can reduce the receiver delay.

Once the lth data vector $\hat{d}^l$ is obtained, the same process is applied to the next OFDM symbol to obtain $\hat{d}^{l+1}$. However, as shown in FIG. 6, not every OFDM symbol has pilots to resolve the phase ambiguity. The spacing between OFDM symbols with pilots in time domain ($\Delta_T$) for LTE-A and DVB-T is only three as depicted in FIG. 6. Consequently, the correlation of the channel frequency responses in the time domain, $[H_n^l(H_n^{l+1})^*] \approx 1$, can be utilized. The following procedure is one possible approach to detect the data symbols in two consecutive OFDM symbols where one of them has pilot symbols and the other does not:

1) Compute $\hat{d}^l$ from $s^l$, which is an OFDM symbol with pilots.
2) Compute $\hat{H}_i^l$ at particular locations within the lth OFDM symbol, $$\hat{H}_i^l = \frac{s_i^l}{\hat{d}_i^l}$$

where $i_{min} \geq 0$ and $i_{max} \ll N$.

3) Compute the phase angle of $\hat{H}_i^l$, $\theta_i^l = a\tan 2[\text{Re}(\hat{H}_i^l), \text{Im}(\hat{H}_i^l)]$.
4) Repeat steps 1 to 3 to compute $\hat{d}^{l+1}$ from $s^{l+1}$, which is an OFDM symbol without pilots.
5) Use the values $\theta_i^l$ to resolve the phase ambiguity of the vector $$\hat{d}^{l+1}, \hat{\rho} = \underset{\hat{\rho}}{\text{argmin}} \|\theta^l - \hat{\rho}\theta^{l+1}\|^2, \hat{\rho} \in \{1, -1\}.$$

The computational complexity of the considered techniques can be assessed in terms of the equivalent computational complexity C, which is a function of the number of real additions (RA), real multiplications (RM), and real divisions (RD) required to produce the set of detected symbols $\hat{d}$ for each technique. In general, one complex multiplication (CM) requires four RMs and three RA, whereas one complex addition (CA) requires two RA. To simplify the analysis, we assume that constant modulus constellations (CMC) such as MPSK are used.

Complexity of Traditional OFDM System:

The complexity of traditional OFDM systems can be evaluated by considering a conventional OFDM receiver that consists of the following main sections with the corresponding computational complexities:

1) Channel estimation of the pilot symbols, which computes $\hat{H}_i$ at the pilot subcarriers. Assuming that the pilot symbol $d_k$ is selected from a constant modulus constellation, then $\hat{H}k = s_k d_k^*$ and hence, $K_{sym}$ complex multiplications are required. Therefore, $C_A^{\{1\}} = 3K_{sym}$ and $C_M^{\{1\}} = 4K_{sym}$.

2) Interpolation, which is used to estimate the channel at the non-pilot subcarriers. The complexity of the interpolation process depends on the interpolation algorithm used. For comparison purposes, we assume that linear interpolation is used, which is the least complex interpolation algorithm. The linear interpolation requires one complex multiplication and two complex additions per interpolated sample. Therefore, the number of complex multiplications required is $N-K_{sym}$ and number of complex additions is $2(N-K_{sym})$. And hence, $C_A^{\{2\}} = 7(N-K_{sym})$ and $C_M^{\{2\}} = 4(N-K_{sym})$.

3) Equalization, a single-tap equalizer requires $N-K_{sym}$ complex division to compute the decision variables $$r_k = \frac{s_k}{\hat{H}_k} = s_k \frac{\hat{H}_k^*}{|\hat{H}_k|^2}.$$

Therefore, one complex division requires two complex multiplications and one real division. Therefore, $C_A^{\{3\}} = 6(N-K_{sym})$, $C_M^{\{3\}} = 8(N-K_{sym})$ and $C_D^{\{3\}} = (N-K_{sym})$.

4) Detection, assuming symbol-by-symbol minimum distance detection, the detector can be expressed as $$\hat{d}_k = \underset{\tilde{d}_k}{\text{argmin}} J(\tilde{d}_k) \text{ where } J(\tilde{d}_k) = |r_k - \tilde{d}_k|^2.$$

Assuming constant modulus modulation, expanding the cost function and dropping the constant terms we can write $J(\tilde{d}_k) = -r_k \tilde{d}_k^* - r_k^* \tilde{d}_k$. We can also drop the minus sign, and thus we have to maximize the cost function $$\hat{d}_k = \underset{\tilde{d}_k}{\text{argmax}} J(\tilde{d}_k).$$

Since the two terms are complex conjugate pair, then $r_k \tilde{d}_k^* + r_k^* \tilde{d}_k = 2\text{Re}\{r_k d_k^*\}$, and thus we can write $$\hat{d}_k = \underset{\tilde{d}_k}{\text{argmax}} (\text{Re}\{r_k\}\text{Re}\{\tilde{d}_k^*\} + \text{Im}\{r_k\}\text{Im}\{\tilde{d}_k^*\}). \quad (25)$$

Therefore, the number of real multiplications required for each information symbol is 2M, and the number of additions is M. Therefore $C_A^{\{4\}} = (N-K_{sym})M$ and $C_M^{\{4\}} = 2(N-K_{sym})M$.

The total computational complexity per OFDM symbol can be obtained by adding the complexities of the individual steps, $$C_A = (13+M)N - (10+M)K_{sym} \quad (26)$$

$$C_M = 2N(6+M) - 2K_{sym}(4+M) \quad (1)$$

$$C_D = N - K_{sym}. \quad (2)$$

B. Complexity of the $D^3$

The compute the complexity based on the Viterbi Algorithm, the branch metrics can be computed as $$J_{m,n}^c = \frac{|s_c|^2}{|\tilde{d}_m|^2} - \frac{s_c s_{c+1}^*}{\tilde{d}_m \tilde{d}_n^*} - \frac{s_c^* s_{c+1}}{\tilde{d}_m^* \tilde{d}_n} + \frac{|s_{c+1}|^2}{|\tilde{d}_n|^2}. \quad (29)$$

For CMC, the first and last terms can be dropped. Hence, $$J_{m,n}^c = \frac{s_c s_{c+1}^*}{\tilde{d}_m \tilde{d}_n^*} - \frac{s_c^* s_{c+1}}{\tilde{d}_m^* \tilde{d}_n}. \quad (30)$$

By noting that the two terms in (30) are the complex conjugate pair, then $$J_{m,n}^c = -2\text{Re}\left\{\frac{s_c s_{c+1}^*}{\tilde{d}_m \tilde{d}_n^*}\right\} \quad (31)$$

Obviously, the constant '2' and the minus sign can be dropped, but in this case the cost function should be maximized. By doing so, denoting $\tilde{d}_m \tilde{d}_n^* \triangleq \tilde{u}_{m,n}$ and expanding (31) we obtain $$J_{m,n}^c = \text{Re}\left\{\frac{\text{Re}(s_c)\text{Re}(s_{c+1}) - \text{Im}(s_c)\text{Im}(s_{c+1}) + j(-\text{Re}(c_k)\text{Im}(c_{k+1}) + \text{Im}(c_k)\text{Re}(c_{k+1}))}{\text{Re}(\tilde{u}_{m,n}) + j\text{Im}(\tilde{u}_{m,n})}\right\}. \quad (32)$$

Using complex numbers identities, $$J_{m,n}^c = \frac{[\text{Re}(s_c)\text{Re}(s_{c+1}) - \text{Im}(s_c)\text{Im}(s_{c+1})]\text{Re}(\tilde{u}_{m,n}) + \text{Im}(\tilde{u}_{m,n})[-\text{Re}(s_c)\text{Im}(s_{c+1}) + \text{Im}(s_c)\text{Re}(s_{c+1})]}{[\text{Re}(\tilde{u}_{m,n})]^2 + [\text{Im}(\tilde{u}_{m,n})]^2}. \quad (33)$$

For CMC, $[\text{Re}(\tilde{u}_{m,n})]^2 + [\text{Im}(\tilde{u}_{m,n})]^2$ is constant, and hence $$J_{m,n}^c = [\text{Re}(s_c)\text{Re}(s_{c+1}) - \text{Im}(s_c)\text{Im}(s_{c+1})]\text{Re}(\tilde{u}_{m,n}) + \text{Im}(\tilde{u}_{m,n})[-\text{Re}(c_k)\text{Im}(s_{c+1}) + \text{Im}(s_c)\text{Re}(s_{c+1})]. \quad (34)$$

To compute $J_{m,n}$, it is worth noting that the two terms in brackets are independent of $\{m,n\}$, and hence, they are computed only once for each value of c. Therefore, the complexity at each step in the trellis can be computed as $$C_A^{\{6\}} = 3 \times 2^M$$

$$C_M^{\{6\}} = 4 + 2 \times 2^M$$

$$C_D^{\{6\}} = 0.$$

here $2^M$ is the number of branches at each step in the trellis. However, if the trellis starts or ends by a pilot, then only M computations are required. By noting that the number of full steps is $N - 2K_{sym} - 1$, and the number of steps that require M computations is $2(K_{sym} - 1)$, then the total computations of the branch metrics are $$C_A^{BM} = (3 \times 2^M)(N - 2K_{sym} - 1) + 2(3 \times M)(K_{sym} - 1)$$

$$C_M^{BM} = [N - 2K_{sym} - 1](4 + 2^{M+1}) + 2(K_{sym} - 1)(4 + 2M)$$

$$C_D^{BM} = 0.$$

The path metrics require $2^{M+1}(N - 2K_{sym} - 1) + M(K_{sym}) - 1$ real addition. Therefore, the total complexity is $$C_A = (N - 2K_{sym} - 1)[5 \times 2^M] + 7M(K_{sym} - 1)$$

$$C_M = (N - 2K_{sym} - 1)(4 + 2^{M+1}) + 2(K_{sym} - 1)(4 + 2M)$$

$$C_D = 0.$$

Figure 9:
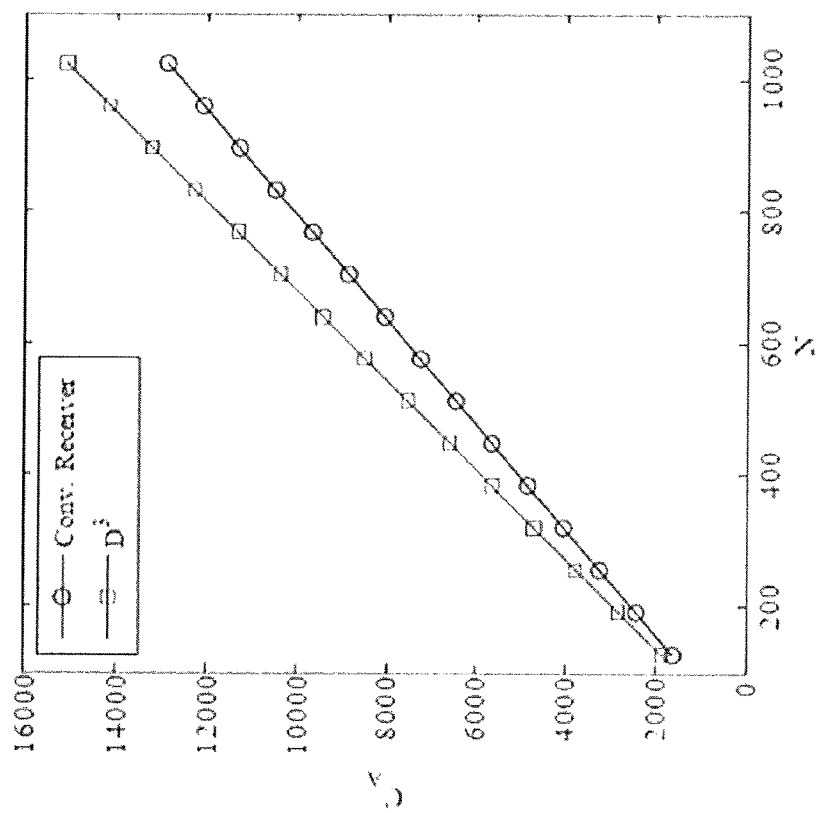
FIG. 9 illustrates the $C_A$ for different values of N, $K_{sym}=74$.
Figure 10:
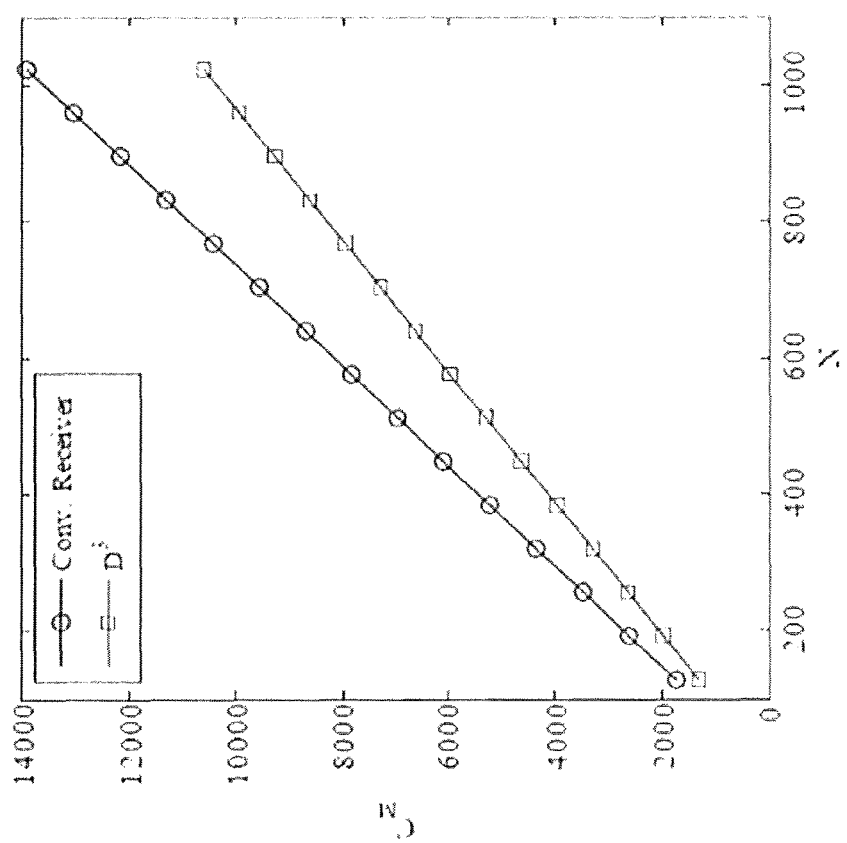
FIG. 10 illustrates the $C_M$ for different values of N, $K_{sym}=74$.

The number of RA and RM of the conventional and new receivers is shown in FIGS. 9 and 10, respectively. As it can be noted from the figure, the $D^3$ managed to reduce the RM by about 25% while the RA are increased by about 16%. Therefore the $D^3$ has a significant complexity advantage because the computational power required to perform a CM is much higher than that for a RA. Moreover, the $D^3$ does not require any divisions.

Numerical Results:

Monte Carlo simulations are used to evaluate the performance of the proposed D 3 algorithm over static frequency-selective multipath fading channels. The OFDM system considered has N=512, P=64, $K_{sym}$ and the pilot spacing $\Delta_F$=6. All data symbols are BPSK modulated with symbol rate of 9.7534 kbps, $T_f$=102.9 s. The multipath fading channel considered is the typical urban (TU) model [25], which corresponds to a moderate frequency-selective channel having 6 taps with normalized delays of [0, 2, 3, 9, 13, 29] samples and average dB-gains of [−3, 0, −2, −6, −8, −10]. In each simulation run, $10^6$ OFDM symbols are generated.

Figure 11:
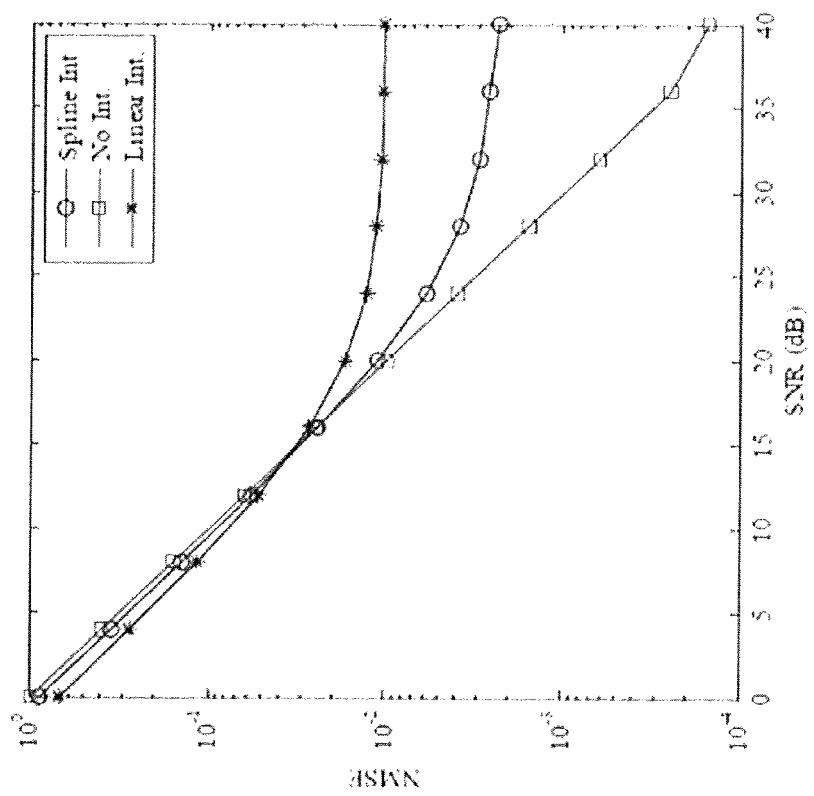
FIG. 11 illustrates the NMSE of the channel parameters using different interpolation techniques.

The impact of the interpolation on the channel estimation process in conventional OFDM systems is depicted in FIG. 11, where the normalized mean squared error (NMSE) is defined as $$NMSE = \frac{1}{\Lambda}\sum_{i=1}^{\Lambda}\frac{|H_i - \hat{H}_i|^2}{|H_i|^2}, \Lambda = (N - K_{sym}) \times 10^6. \quad (35)$$

The no interpolation case is used as a benchmark for comparison where all subcarriers are treated as pilots, and hence, no interpolation is needed, in such a case, the channel estimation error is caused by the AWGN exclusively As it can be noted from the figure, the interpolation is a major source for channel estimation errors, which might deteriorate the system BER drastically. However, the performance degradation caused by the interpolation can be moderated by incorporating advanced interpolation techniques, but that comes at the expense of additional computational complexity. To compare the performance of the $D^3$ in terms of complexity and BER, two different interpolation techniques are considered, namely, linear interpolation (LI) and cubic Spline interpolation (SI). As it can be noted from FIG. 11, the NMSE has a switch-over point at −16 dB. SNR≥dB, the NMSE with no interpolation has the best performance while the LI has the worst, and the SI is almost in between. For SNR≤16, the results are inverted, which is caused by the noise filtering effect of the interpolation function. However, the NMSE difference between all cases is negligible.

Figure 12:
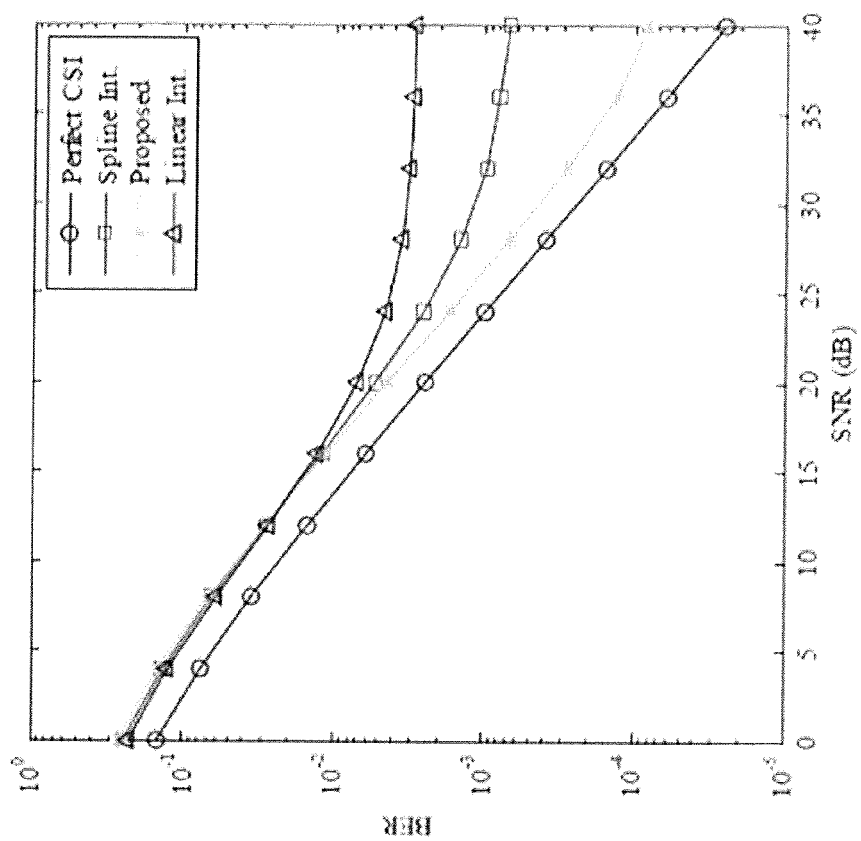
FIG. 12 illustrates the BER of the new $D^3$ system compared to conventional OFDM systems with different channel estimation methods.

The BER of the considered OFDM system using the proposed detector as well as conventional OFDM detectors is shown in FIG. 12. As it can be noted from the figure, the CSI case performs the best, which is expected, because no channel estimation errors are involved. The LI and SI introduced error floors at high SNR because the channel estimation errors become dominant at such high SNR values. Unlike interpolation-based systems, the $D^3$ demonstrated superior performance as compared to the SI and LI where no error floors were exhibited, and the BER performance degradation is about 2 dB at BER of $10^{-3}$.

This invention presents a new efficient receiver for OFDM based communication systems. The new receiver performs direct data detection without the need to go through channel estimation, equalization and information symbol detection. Consequently, the computational complexity can be reduced and the error performance can be improved. Moreover, the new system can relax the requirements for pilots and hence it can improve the spectral efficiency of OFDM systems.

In view of the above, it is understood that the proposed system and method can be considered as a revolutionary approach for data recovery in digital communication systems. In traditional receivers, the data recovery process comprises several stages such as channel estimation, equalization and detection. These operations usually require considerable computational power, and may involve symbol pilot insertion, which reduces the system spectral efficiency. The complexity, system error performance and spectral efficiency are conflicting parameters in traditional systems because improving one parameter degrades the others. However, the present invention provides system and method for data extraction which is error less, more efficient and involves less complexity. Therefore, reducing the power usage of the mobile devices.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

REFERENCES

[1] Radio broadcasting systems; digital audio broadcasting (DAB) to mobile, portable and fixed receivers, ETS Standard 300 401, 1995.
[2] Digital video broadcasting (DVB); framing structure, channel coding and modulation for digital terrestrial television, ETSI Standard EN 300744 v1.6.1, 2008.
[3] IEEE Standard for Local and metropolitan area networks Part 16: Air Interface for Broadband Wireless Access Systems Amendment 3: Advanced Air Interface, IEEE Standard 802.16m, 2011.
[4] LTE; Evolved Universal Terrestrial Radio Access (E-UTRA) and Evolved Universal Terrestrial Radio Access Network (E-UTRAN); Overall description, 3GPP Standard TS 36.300, 2011.
[5] IEEE 802.11p: Wireless LAN Medium Access Control (MAC) and Physical Layer (PHY) Specifications Amendment 6: Wireless Access in Vehicular Environments, Jul. 15, 2010.
[6] IEEE Standard for Broadband over Power Line Networks: Medium Access Control and Physical Layer Specifications, IEEE Standard 1901, 2010.
[7] Weile Zhang, Qinye Yin, Wenjie Wang, and Feifei Gao, "One-Shot Blind CFO and Channel Estimation for OFDM With Multi-Antenna Receiver," IEEE Transactions on Signal Processing, vol. 62, no. 15, pp. 3799-3808, August 2014.
[8] Song Noh, Youngchul Sung, Michael Zoltowski, "A New Precoder Design for Blind Channel Estimation in MIMO-OFDM Systems," IEEE Transactions on Wireless Communications, vol. 13, no. 12, pp. 7011-7024, December 2014.
[9] Xiaofei Zhang and Dazhuan Xu, "Blind channel estimation for multiple antenna OFDM system subject to unknown carrier frequency offset," Journal of Systems Engineering and Electronics, vol. 25, no. 5, pp. 721-727, October 2014.
[10] Chi-Hsiang Tseng, Yu-Chieh Cheng, and Char-Dir Chung, "Subspace-Based Blind Channel Estimation for OFDM by Exploiting Cyclic Prefix," IEEE Wireless Communications Letters, vol. 2, no. 6, pp. 691-694, December 2013.
[11] S. Banani and R. Vaughan, "OFDM With Iterative Blind Channel Estimation," IEEE Transactions on Vehicular Technology, vol. 59, no. 9, pp. 4298-4308, November 2010.
[12] Hongting Zhang and Hsiao-Chun Wu, "Robust Pilot Detection Techniques for Channel Estimation and Symbol Detection in OFDM Systems," IEEE Signal Processing Letters, vol. 22, no. 6, pp. 733-737, June 2015.
[13] Chenhao Qi, Guosen Yue, Lenan Wu, and A. Nallanathan, "Pilot Design for Sparse Channel Estimation in OFDM-Based Cognitive Radio Systems," IEEE Transactions on Vehicular Technology, vol. 63, no. 2, pp. 982-987, February 2014.
[14] Guanghui Liu, Liaoyuan Zeng, Hongliang Li, Linfeng Xu, and Zhengning Wang, "Adaptive complex interpolator for channel estimation in pilot-aided OFDM system," Journal of Communications and Networks, vol. 15, no. 5, pp. 496-503, October 2013.
[15] Jung-Chieh Chen, Chao-Kai Wen, and Pangan Ting, "An Efficient Pilot Design Scheme for Sparse Channel Estimation in OFDM Systems," IEEE Communications Letters, vol. 17, no. 7, pp. 1352-1355, July 2013.
[16] Mingchao Yu and P. Sadeghi, "A Study of Pilot-Assisted OFDM Channel Estimation Methods With Improvements for DVB-T2," IEEE Transactions on Vehicular Technology, vol. 61, no. 5, pp. 2400-2405, June 2012.
[17] P. Tan and N. Beaulieu, "Effect of Channel Estimation Error on Bit Error Probability in OFDM Systems over Rayleigh and Ricean Fading Channels" IEEE Transactions on Communications, vol. 56, no. 4, pp. 675-685., April 2008.
[18] S. Tomasin and M. Butussi, "Analysis of interpolated channel estimation for mobile OFDM systems,", IEEE Transactions on Communications, vol. 58, no. 5, pp. 1578-1588, May 2010.
[19] M. Simko, P. Diniz, Qi Wang, and M. Rupp, "Adaptive Pilot-Symbol Patterns for MIMO OFDM Systems," IEEE Transactions on Wireless Communications, vol. 12, no. 9, pp. 4705-4715, September 2013.
[20] F. D'Agostini, S. Carboni, M. De Castro, F. De Castro, and D. Trindade, "Adaptive Concurrent Equalization Applied to Multicarrier OFDM Systems," IEEE Transactions on Broadcasting, vol. 54, no. 3, pp. 441-447, September 2008.
[21] M. Henkel, C. Schilling, and W. Schroer, "Comparison of Channel Estimation Methods for Pilot Aided OFDM Systems," IEEE 65th Vehicular Technology Conference, V T C 2007-Spring, pp. 1435-1439, April 2007.
[22] A. Al-Dweik, A. Hazmi, S. Younis, B. Sharif, C. Tsimenidis, "Carrier Frequency Offset Estimation for OFDM Systems Over Mobile Radio Channels," IEEE Transactions on Vehicular Technology, vol. 59, no. 2, pp. 974-979, February 2010.
[23] X. Zeng and A. Ghrayeb "A Blind Carrier Frequency Offset Estimation Scheme for OFDM Systems with Constant Modulus Signaling", IEEE Transactions on Communications, vol. 56, no. 7, pp. 1032-1037, July 2008.

[24] W. C. Jakes, Microwave Mobile Communications. Piscataway, N.J.: IEEE Press, 1994.
[25] Universal Mobile Telecommunications System (UMTS); Deployment aspects, 3GPP TR 25.943 version 9.0.0 Release 9.

The invention claimed is:

1. A computer-implemented method of estimating transmitted signals in a communication system, the method comprising:
   receiving, by a receiver, signals having been transmitted over a communication channel having a channel response;
   estimating, by a processor, the signals based on generated trial sequences minimizing the channel response between adjacent received signals;
   generating trial sequences according to a sequence detection technique;
   dividing the received signals by the trial sequences for generating ratios between the received signals and the trial sequences; and
   determining the trial sequences minimizing the difference between the ratios for adjacent signals,
      wherein the estimated signals are the equivalents of the trial sequences minimizing the difference between the ratios for the adjacent signals,
      wherein the adjacent signals are one of (i) consecutive in frequency and (ii) consecutive in time.

2. A receiver comprising:
   a signal detector for estimating transmitted signals in a communication system, the signals being transmitted by a transmitter to the receiver over a communication channel having a channel response,
   wherein the signal detector is configured to:
      estimate the signals based on generated trial sequences minimizing the channel response between adjacent received signals,
      generate trial sequences according to a sequence detection technique;
      divide the signals by the trial sequences for generating ratios between the signals and the trial sequences; and
      determine the trial sequences minimizing the difference between the ratios for adjacent signals,
   wherein the estimated signals are the equivalents of the trial sequences minimizing the difference between the ratios for the adjacent signals, and
   wherein the adjacent signals are one of (i) consecutive in frequency and (ii) consecutive in time.

3. A signal detector device comprising:
   a processor for estimating transmitted signals in a communication system, the signals being transmitted by a transmitter to a receiver over a communication channel having a channel response,
   wherein the processor is configured to:
      estimate the signals based on generated trial sequences minimizing the channel response between adjacent received signals,
      generate trial sequences according to a sequence detection technique;
      divide the signals by the trial sequences for generating ratios between the signals and the trial sequences; and
      determine the trial sequences minimizing the difference between the ratios for adjacent signals,
   wherein the estimated signals are the equivalents of the trial sequences minimizing the difference between the ratios for the adjacent signals, and
   wherein the adjacent signals are one of (i) consecutive in frequency and (ii) consecutive in time.

4. The signal detector device as claimed in claim 3 wherein the signals are two consecutive signals.

5. The signal detector device as claimed in claim 3 wherein the sequence detection technique comprises a linear search process.

6. The signal detector device as claimed in claim 3 wherein the sequence detection technique comprises a Viterbi search process.

7. The signal detector device as claimed in claim 3 wherein the communication system is an OFDM communication system and the receiver is an OFDM receiver.

8. A communication system comprising:
   a transmitter for transmitting signals;
   a receiver for receiving the signals; and
   a signal detector configured to be connected to the receiver for estimating the signals, the signals being transmitted by the transmitter to the receiver over a communication channel having a channel response,
   wherein the signal detector is configured to:
      estimate the signals based on generated trial sequences minimizing the channel response between adjacent received signals,
      generate trial sequences according to a sequence detection technique;
      divide the signals by the trial sequences for generating ratios between the signals and the trial sequences; and
      determine the trial sequences minimizing the difference between the ratios for adjacent signals,
   wherein the estimated signals are the equivalents of the trial sequences minimizing the difference between the ratios for the adjacent signals, and
   wherein the adjacent signals are one of (i) consecutive in frequency and (ii) consecutive in time.

* * * * *